United States Patent
Hadano et al.

(10) Patent No.: US 11,724,563 B2
(45) Date of Patent: Aug. 15, 2023

(54) VEHICLE CONTROL DEVICE, VEHICLE CONTROL METHOD, NON-TRANSITORY STORAGE MEDIUM AND VEHICLE CONTROL SYSTEM

(71) Applicants: TOYOTA JIDOSHA KABUSHIKI KAISHA, Toyota (JP); DENSO CORPORATION, Kariya (JP)

(72) Inventors: Hiroyasu Hadano, Toyota (JP); Takaaki Inokuchi, Nagoya (JP); Tatsunori Katoh, Nagoya (JP); Asuka Marumo, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 225 days.

(21) Appl. No.: 17/174,608

(22) Filed: Feb. 12, 2021

(65) Prior Publication Data
US 2021/0309071 A1    Oct. 7, 2021

(30) Foreign Application Priority Data
Apr. 1, 2020   (JP) ................. 2020-066148

(51) Int. Cl.
*F01N 3/20* (2006.01)
*B60H 1/00* (2006.01)
*F01N 9/00* (2006.01)

(52) U.S. Cl.
CPC ..... *B60H 1/00657* (2013.01); *B60H 1/00878* (2013.01); *F01N 3/2013* (2013.01);
(Continued)

(58) Field of Classification Search
CPC .... F02N 11/08; F02N 11/0803; F02N 11/087; B60H 1/00642; B60H 1/00657;
(Continued)

(56) References Cited

U.S. PATENT DOCUMENTS 9,352,680 B2 * 5/2016 Cermak .................. B60R 25/24
2004/0111199 A1 * 6/2004 Javaherian ............ F02D 41/064
701/2
(Continued)

FOREIGN PATENT DOCUMENTS

JP          10-252623 A      9/1998

*Primary Examiner* — John Kwon
*Assistant Examiner* — Johnny H Hoang
(74) *Attorney, Agent, or Firm* — Oblon, McClelland, Maier & Neustadt, L.L.P.

(57) ABSTRACT

A vehicle control device includes a controller configured to execute: receiving a remote signal containing a target temperature in a cabin and an expected traveling start time of a vehicle from a remote controller used by a user of the vehicle; calculating a catalyst warming period which is an estimated period required to warm, to an active temperature, an electrically heated catalyst; calculating a pre-air conditioning period which is an estimated period required to adjust a temperature in the cabin to the target temperature; and starting pre-air conditioning of the cabin by starting an internal combustion engine after completion of warming of the electrically heated catalyst when a sum of the catalyst warming period and the pre-air conditioning period is equal to or shorter than a starting time margin from a time of reception of the remote signal to the expected traveling start time.

20 Claims, 7 Drawing Sheets

(52) U.S. Cl.
CPC ............ *F01N 9/00* (2013.01); *F01N 2900/10* (2013.01); *F01N 2900/1602* (2013.01)

(58) Field of Classification Search
CPC ... B60H 1/00878; F01N 9/00; F01N 2900/10; F01N 2900/1602; F02D 41/06
USPC .............................. 701/45, 49; 340/438, 449
See application file for complete search history.

(56) References Cited

U.S. PATENT DOCUMENTS

2008/0051979 A1* 2/2008 Yasui .................... F02D 41/008
  701/105
2018/0334170 A1* 11/2018 Liu ....................... B60W 10/30

\* cited by examiner

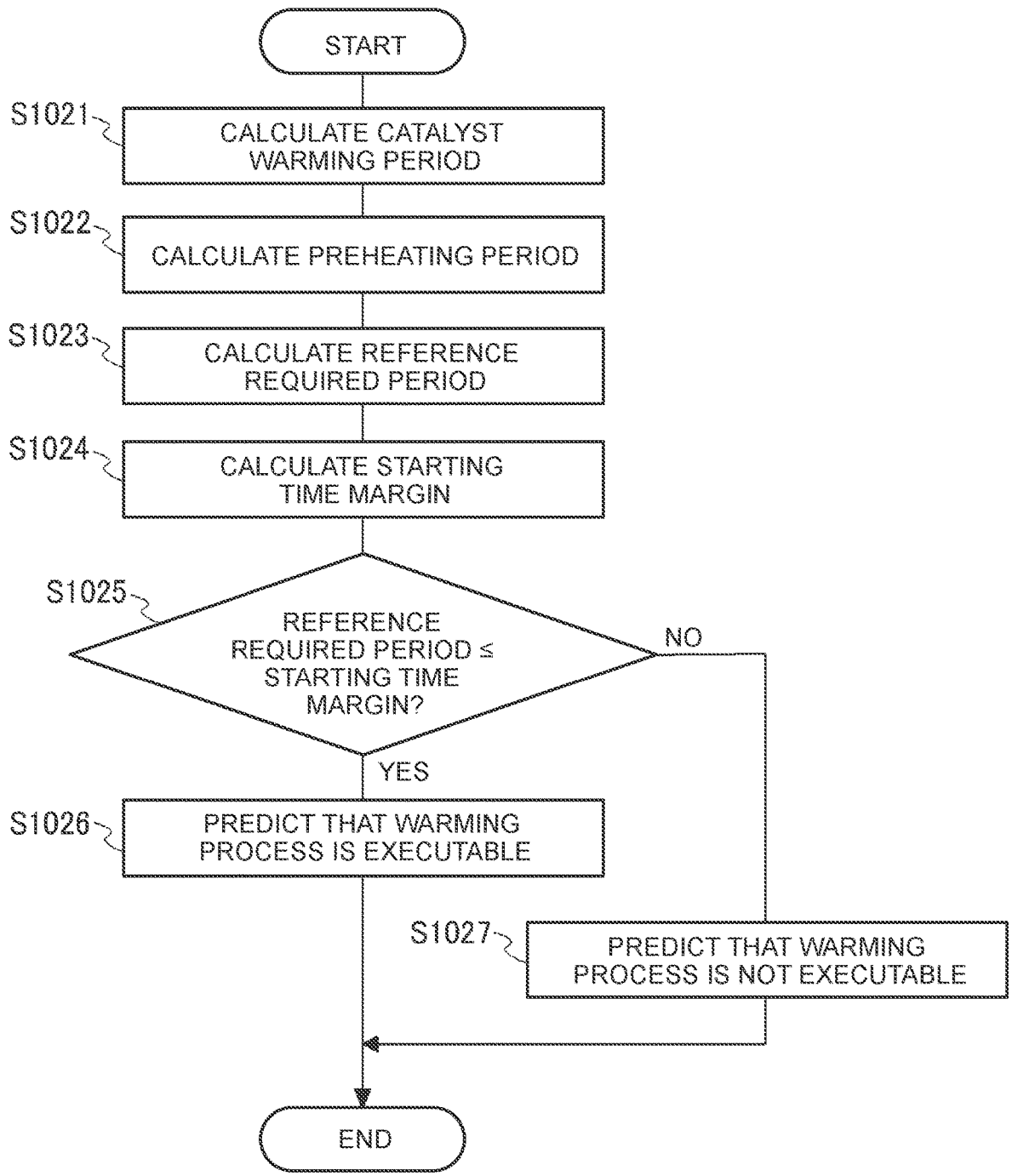

VEHICLE CONTROL DEVICE, VEHICLE CONTROL METHOD, NON-TRANSITORY STORAGE MEDIUM AND VEHICLE CONTROL SYSTEM

CROSS-REFERENCE TO RELATED APPLICATION

This application claims priority to Japanese Patent Application No. 2020-066148 filed on Apr. 1, 2020, incorporated herein by reference in its entirety.

BACKGROUND

1. Technical Filed

The present disclosure relates to a vehicle control device, a vehicle control method, a non-transitory storage medium and a vehicle control system.

2. Description of Related Art

Among air conditioners to be mounted on vehicles such as automobiles, there is known a technology of preheating a cabin of the vehicle by starting an internal combustion engine through a remote operation to activate a heating function of the air conditioner (see, for example, Japanese Unexamined Patent Application Publication No. 10-252623 (JP 10-252623 A)).

SUMMARY

The present disclosure provides a technology in which a vehicle configured to perform pre-air conditioning of its cabin by operating an internal combustion engine through a remote operation can minimize a decrease in environmental performance along with execution of the pre-air conditioning.

A vehicle control device according to a first aspect of the present disclosure includes a controller configured to execute: receiving a remote signal containing a target temperature in a cabin and an expected traveling start time of a vehicle from a remote controller used by a user of the vehicle; calculating a catalyst warming period which is an estimated period required to warm, to an active temperature, an electrically heated catalyst disposed in an exhaust passage of an internal combustion engine; calculating a pre-air conditioning period which is an estimated period required to adjust a temperature in the cabin to the target temperature; and starting pre-air conditioning of the cabin by starting the internal combustion engine after completion of warming of the electrically heated catalyst when a sum of the catalyst warming period and the pre-air conditioning period is equal to or shorter than a starting time margin from a time of reception of the remote signal to the expected traveling start time.

A vehicle control method according to a second aspect of the present disclosure includes: receiving, by a computer, a remote signal containing a target temperature in a cabin and an expected traveling start time of a vehicle from a remote controller used by a user of the vehicle; calculating, by the computer, a catalyst warming period, which is an estimated period required to warm, to an active temperature, an electrically heated catalyst disposed in an exhaust passage of an internal combustion engine; calculating, by the computer, a pre-air conditioning period which is an estimated period required to adjust a temperature in the cabin to the target temperature; and starting, by the computer, pre-air conditioning of the cabin by starting the internal combustion engine after completion of warming of the electrically heated catalyst when a sum of the catalyst warming period and the pre-air conditioning period is equal to or shorter than a starting time margin from a time of reception of the remote signal to the expected traveling start time.

A non-transitory storage medium according to a third aspect of the present disclosure stores instructions that are executable by a computer and that cause the computer to perform the vehicle control method of the second aspect.

A vehicle control system according to a fourth aspect of the present disclosure includes: a remote controller to be used by a user of a vehicle, the remote controller being configured to, when a pre-air conditioning request containing a target temperature in a cabin and an expected traveling start time of the vehicle is received, transmit a remote signal containing the target temperature and the expected traveling start time; and a control device configured to, when the remote signal is received from the remote controller, perform pre-air conditioning of the cabin based on the target temperature and the expected traveling start time, wherein the control device includes a controller configured to, when the remote signal is received: calculate a catalyst warming period, which is an estimated period required to warm, to an active temperature, an electrically heated catalyst disposed in an exhaust passage of an internal combustion engine; calculate a pre-air conditioning period, which is an estimated period required to adjust a temperature in the cabin to the target temperature; and start the pre-air conditioning of the cabin by starting the internal combustion engine after completion of warming of the electrically heated catalyst when a sum of the catalyst warming period and the pre-air conditioning period is equal to or shorter than a starting time margin from a time of reception of the remote signal to the expected traveling start time.

With the present disclosure, it is possible to provide the technology in which the vehicle configured to perform pre-air conditioning of its cabin by operating the internal combustion engine through a remote operation can minimize the decrease in the environmental performance along with execution of the pre-air conditioning.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 10 is a flowchart illustrating a flow of a process to be performed by the A-ECU for prediction of whether an EHC warming process is executable.

DETAILED DESCRIPTION OF EMBODIMENTS

Figure 1:
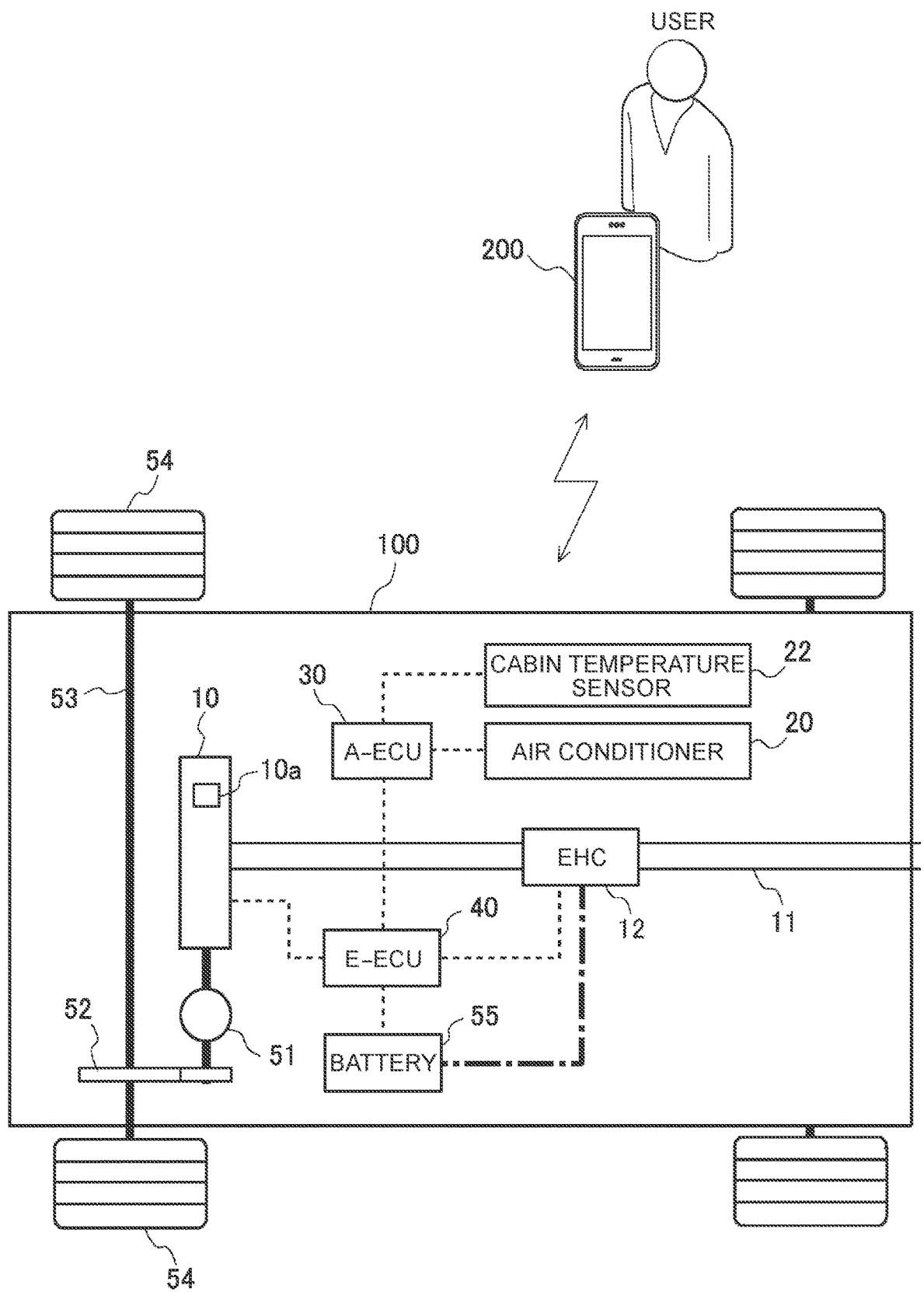
FIG. 1 is a diagram illustrating the overall configuration of a vehicle control system according to an embodiment.

An embodiment disclosed herein is directed to an example in which a vehicle control device according to the present disclosure is applied to a vehicle control system. The vehicle control system in this example performs pre-air conditioning of a cabin through a remote operation by using, for example, exhaust heat generated when an internal combustion engine operates, or a compressor driven by the internal combustion engine. The "pre-air conditioning" is heating (preheating) or cooling (precooling) of the cabin in advance before the vehicle starts traveling (for example, before a user rides in the vehicle or before the user starts driving the vehicle). The vehicle to which the control system is applied includes an internal combustion engine and an electrically heated catalyst disposed in an exhaust passage of the internal combustion engine. For example, the electrically heated catalyst includes an exhaust gas control catalyst and a heating element. The exhaust gas control catalyst controls exhaust gas from the internal combustion engine when the temperature of the exhaust gas control catalyst is equal to or higher than an active temperature. The heating element heats the exhaust gas control catalyst by generating heat through energization.

In the vehicle control system in this example, a remote controller used by the user receives a pre-air conditioning request from the user. The pre-air conditioning request in this example contains information specifying a target temperature in the cabin, and information specifying an expected traveling start time of the vehicle. When the remote controller receives the pre-air conditioning request, the remote controller transmits a remote signal to the vehicle control device. The remote signal contains pieces of information related to the target temperature and the expected traveling start time specified by the user.

When the vehicle control device receives the remote signal, a controller calculates an estimated period required to warm the electrically heated catalyst to the active temperature (catalyst warming period), and an estimated period required to adjust the temperature in the cabin to the target temperature (pre-air conditioning period). The "warming of the electrically heated catalyst" is an operation of increasing the temperature of the electrically heated catalyst to the active temperature by energizing the electrically heated catalyst.

The catalyst warming period is correlated to a temperature of the electrically heated catalyst before the start of the warming. For example, when the temperature of the electrically heated catalyst before the start of the warming is low, the catalyst warming period tends to be longer than the catalyst warming period when the temperature of the electrically heated catalyst before the start of the warming is high. Therefore, the controller may calculate the catalyst warming period based on the temperature of the electrically heated catalyst before the start of the warming.

The pre-air conditioning period is correlated to at least one of, for example, a temperature difference between the target temperature and a temperature in the cabin before the start of the pre-air conditioning, and a temperature of the internal combustion engine before the start of the pre-air conditioning. For example, when the temperature difference between the target temperature and the temperature in the cabin before the start of the pre-air conditioning is large, the pre-air conditioning period tends to be longer than the pre-air conditioning period when the temperature difference is small. In the preheating using exhaust heat from the internal combustion engine, the pre-air conditioning period is correlated to a temperature of the internal combustion engine before the start of the preheating as well as the temperature difference. That is, when the temperature of the internal combustion engine before the start of the preheating is low, the pre-air conditioning period tends to be longer than the pre-air conditioning period when the temperature of the internal combustion engine before the start of the preheating is high. Therefore, the controller may calculate the pre-air conditioning period based on at least one of the temperature difference between the target temperature and the temperature in the cabin before the start of the pre-air conditioning, and the temperature of the internal combustion engine before the start of the pre-air conditioning.

When the catalyst warming period and the pre-air conditioning period are calculated, the controller determines the sum of the catalyst warming period and the pre-air conditioning period (may hereinafter be referred to as "reference required period"). When the reference required period is equal to or shorter than a starting time margin, the controller first performs the warming of the electrically heated catalyst. The controller starts the pre-air conditioning of the cabin by starting the internal combustion engine after completion of the warming of the electrically heated catalyst. For example, those processes are started at a time going back from the expected traveling start time by the reference required period, or a time going back from the obtained time by a further margin. The "starting time margin" is a time margin from the time of reception of the remote signal by the control device to the expected traveling start time.

When the pre-air conditioning of the cabin is performed through the procedure described above, the electrically heated catalyst is activated at a timing when the internal combustion engine is started for the pre-air conditioning of the cabin. Therefore, it is possible to suppress an increase in exhaust gas emission along with the execution of the pre-air conditioning. Thus, it is possible to suppress a decrease in environmental performance along with the pre-air conditioning.

When the reference required period is longer than the starting time margin, the pre-air conditioning of the cabin may be performed by automatically starting the internal combustion engine. At this time, the warming of the electrically heated catalyst may be performed in parallel or may be omitted. In short, when the reference required period is longer than the starting time margin, the pre-air conditioning of the cabin may be performed by starting the internal combustion engine before the completion of the warming of the electrically heated catalyst.

A user who is aware of the environmental performance may be unwilling to start the internal combustion engine before the completion of the warming of the electrically heated catalyst. When the reference required period is longer than the starting time margin, the pre-air conditioning of the cabin may be performed with the consent of the user. For example, when the reference required period is longer than the starting time margin, the controller may first transmit, to the remote controller, a signal for prompting the user to select whether to permit execution of the pre-air conditioning of the cabin (may hereinafter be referred to as "first selection request signal"). The first selection request signal contains information for notifying the user that the warming of the electrically heated catalyst cannot be completed before the execution of the pre-air conditioning of the cabin. When a signal for permitting execution of the pre-air conditioning of the cabin is returned from the remote controller, the controller may start the pre-air conditioning of the cabin by starting the internal combustion engine. Thus, the start of the internal combustion engine, that is, the decrease in the environmental performance against the user's intention is suppressed in a situation in which the warming of the electrically heated catalyst cannot be completed before the start of the pre-air conditioning.

When the signal transmitted from the remote controller in response to the first selection request signal is a signal for rejecting execution of the pre-air conditioning, the controller may prompt the user to change the target temperature. For example, the controller may first calculate a temperature in the cabin that is predicted to reach before the expected traveling start time under the assumption that the pre-air conditioning of the cabin is started from a time of the completion of the warming of the electrically heated catalyst (first reachable temperature). At this time, the controller may calculate the first reachable temperature based on at least one of the temperature in the cabin before the start of the pre-air conditioning, the temperature of the internal combustion engine before the start of the pre-air conditioning, and a pre-air conditioning time margin. The "pre-air conditioning time margin" is a time margin from an estimated time of the completion of the warming of the electrically heated catalyst to the expected traveling start time. When the first reachable temperature is calculated by this method, the controller may transmit, to the remote controller, a signal for prompting the user to change the target temperature to the first reachable temperature (may hereinafter be referred to as "change request signal"). The change request signal contains information for notifying the user that the target temperature needs to be changed to execute the pre-air conditioning of the cabin after the completion of the warming of the electrically heated catalyst. When a signal for permitting change of the target temperature to the first reachable temperature is received by the control device from the remote controller, the controller may start the pre-air conditioning of the cabin after the completion of the warming of the electrically heated catalyst. In this case, the pre-air conditioning is performed based on the changed target temperature (first reachable temperature). As a result, the temperature in the cabin can be increased or reduced to the extent possible while suppressing the decrease in the environmental performance.

When the reference required period is longer than the starting time margin, the pre-air conditioning period is not always equal to or shorter than the starting time margin. That is, the pre-air conditioning period may be longer than the starting time margin. In this case, it is difficult to adjust the temperature in the cabin to the target temperature within a period before the expected traveling start time even if the pre-air conditioning of the cabin is performed with the consent of the user. When the pre-air conditioning period is longer than the starting time margin, the pre-air conditioning of the cabin may be performed with the consent of the user about the execution of the pre-air conditioning with the changed target temperature. In this case, the controller may first calculate a temperature in the cabin that is predicted to reach before the expected traveling start time under the assumption that the pre-air conditioning of the cabin is started immediately (second reachable temperature). For example, the controller may calculate the second reachable temperature based on at least one of the temperature in the cabin before the start of the pre-air conditioning, the temperature of the internal combustion engine before the start of the pre-air conditioning, and the starting time margin. When the second reachable temperature is calculated by this method, the controller may transmit, to the remote controller, a signal for prompting the user to select whether to permit execution of the pre-air conditioning of the cabin with the target temperature changed to the second reachable temperature (may hereinafter be referred to as "second selection request signal"). The second selection request signal contains information for notifying the user that the warming of the electrically heated catalyst cannot be completed before the execution of the pre-air conditioning. When a signal for permitting execution of the pre-air conditioning with the target temperature changed to the second reachable temperature is received by the control device from the remote controller, the controller may start the pre-air conditioning of the cabin by immediately starting the internal combustion engine. Thus, the start of the internal combustion engine against the user's intention is suppressed in a situation in which the warming of the electrically heated catalyst cannot be completed, and the failure to increase or reduce the temperature in the cabin to a temperature recognized by the user is suppressed.

Embodiment

A more specific embodiment relating to the vehicle control system is described below with reference to the drawings.

Overview of System

FIG. 1 is a diagram illustrating the overall configuration of the vehicle control system according to this embodiment. As illustrated in FIG. 1, the control system in this example includes a vehicle 100 and a remote controller 200. The vehicle 100 in this example is driven by an internal combustion engine 10 as a prime mover. An air conditioner 20 is mounted on the vehicle 100 to condition air in its cabin. The remote controller 200 is a device for remotely controlling air conditioning of the vehicle 100, and is used by a user of the vehicle 100. In this control system, the user operates the remote controller 200 before riding in the vehicle 100 to condition air in the cabin by the air conditioner 20 (pre-air conditioning). Thus, the temperature in the cabin can be adjusted to a comfort temperature in a period before the user rides in the vehicle 100. In this example, the cabin is heated (preheated) as the pre-air conditioning.

Configuration of Vehicle 100

A specific configuration of the vehicle 100 according to this embodiment is described. As illustrated in FIG. 1, the vehicle 100 includes the internal combustion engine 10 and the air conditioner 20. The internal combustion engine 10 is a spark-ignition internal combustion engine (gasoline engine) or a compression-ignition internal combustion engine (diesel engine) having at least one cylinder. An output shaft (crankshaft) of the internal combustion engine 10 is coupled to an axle 53 via, for example, a transmission 51 and a speed reducer 52, and driving wheels 54 are driven to rotate by using power of the internal combustion engine 10.

An exhaust passage 11 is connected to the internal combustion engine 10. Gas burned in the internal combustion engine 10 flows through the exhaust passage 11. An electrically heated catalyst (EHC) 12 is provided midway along the exhaust passage 11. The EHC 12 is an exhaust gas control catalyst provided with a heating element configured to generate heat through energization. The overall structure of the EHC 12 is described with reference to FIG. 2. An arrow in FIG. 2 indicates an exhaust gas flow direction.

Figure 2:
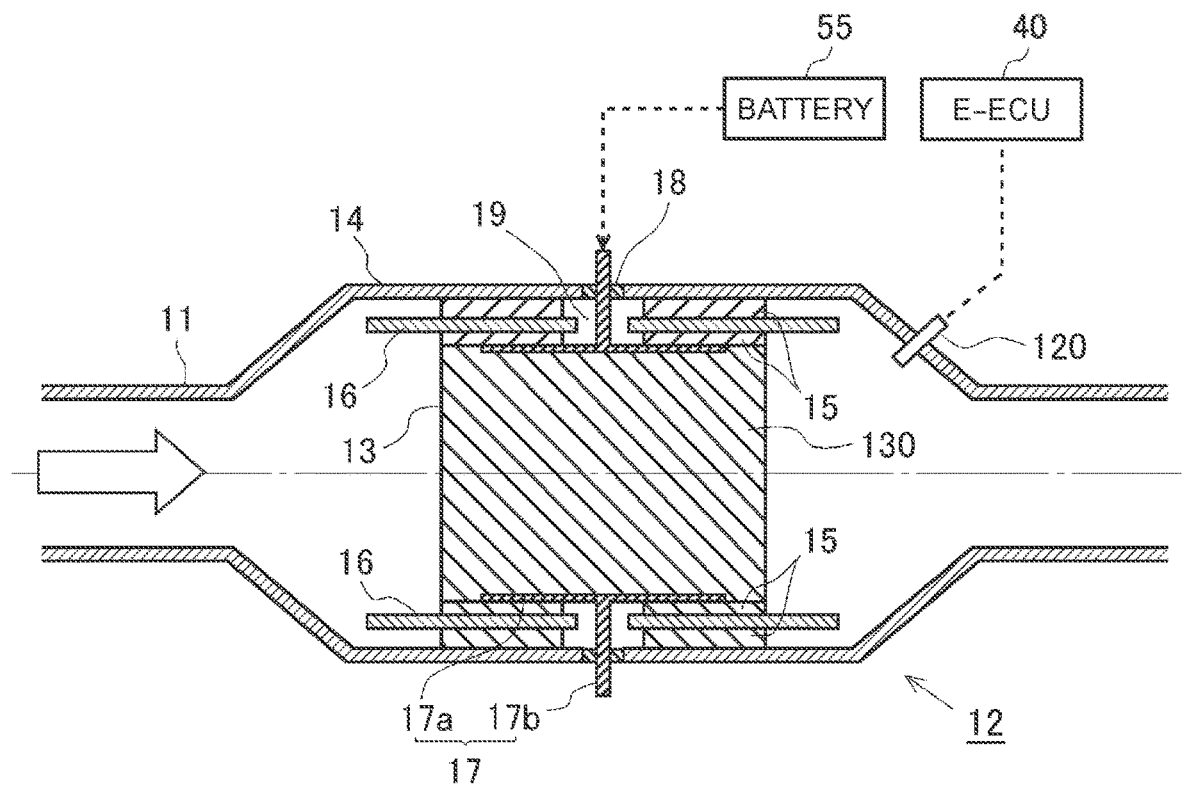
FIG. 2 is a diagram illustrating the overall structure of an electrically heated catalyst (EHC)

As illustrated in FIG. 2, the EHC 12 includes a columnar catalyst support 13, an inner tube 16 having a tube shape, and a tubular case 14. The inner tube 16 covers the catalyst support 13. The case 14 covers the inner tube 16. The catalyst support 13, the inner tube 16, and the case 14 are arranged coaxially.

The catalyst support 13 is a structure having a plurality of passages extending in the exhaust gas flow direction and arranged in a honeycomb pattern. The outer shape of the structure is a columnar shape. The catalyst support 13 supports an exhaust gas control catalyst 130. Examples of the exhaust gas control catalyst 130 include an oxidation catalyst, a three-way catalyst, a $NO_x$ storage reduction (NSR) catalyst, a selective catalytic reduction (SCR) catalyst, and combinations of those catalysts. When the temperature of the exhaust gas control catalyst 130 is equal to or higher than an active temperature, the exhaust gas control capacity is activated. The catalyst support 13 in this example functions as a heating element by being formed from a base whose electrical resistance is relatively high like a porous ceramic (SiC) and is higher at a low temperature than is at a high temperature (that is, a base having a negative temperature coefficient (NTC) characteristic).

The inner tube 16 is obtained such that an insulator having a low electric conductivity and a high heat resistance (for example, alumina or stainless steel coated with an insulating layer on its surface) is formed into a cylindrical shape. The inner diameter of the inner tube 16 is larger than the outer diameter of the catalyst support 13. The case 14 is a housing that is made of a metal (for example, stainless steel) and houses the catalyst support 13 and the inner tube 16.

Tubular mat members 15 are press-fitted between the inner peripheral surface of the inner tube 16 and the outer peripheral surface of the catalyst support 13, and between the inner peripheral surface of the case 14 and the outer peripheral surface of the inner tube 16. The mat member 15 is formed from an insulator having a low electric conductivity and a high cushioning property (inorganic fiber mat such as an alumina fiber mat).

A pair of through holes 19 is provided at two opposite positions on the outer peripheral surface of the case 14 to extend through the case 14, the mat members 15, and the inner tube 16. Electrodes 17 are provided through the respective through holes 19. Each electrode 17 includes a surface electrode 17a and a shaft electrode 17b. The surface electrode 17a extends in a circumferential direction and an axial direction along the outer peripheral surface of the catalyst support 13. The shaft electrode 17b extends from the outer peripheral surface of the surface electrode 17a to the outside of the case 14 through the through hole 19.

Support members 18 are provided at the edges of the through holes 19 in the case 14 to support the shaft electrodes 17b, respectively. Each support member 18 covers an annular opening between the case 14 and the shaft electrode 17b. The support member 18 is formed from an insulator having a low electric conductivity to suppress a short circuit between the shaft electrode 17b and the case 14.

The shaft electrodes 17b are connected to a battery 55. An engine electronic control unit (E-ECU) 40 described later controls application of a voltage to the shaft electrodes 17b from the battery 55. When the E-ECU 40 controls the battery 55 to apply a voltage to the shaft electrodes 17b to energize the EHC 12, the catalyst support 13 generates heat as an electrical resistor. Therefore, the exhaust gas control catalyst 130 supported on the catalyst support 13 is warmed by receiving the heat from the catalyst support 13. By energizing the EHC 12 when the temperature of the exhaust gas control catalyst 130 is lower than the active temperature, the temperature of the exhaust gas control catalyst 130 can be increased to the active temperature. By energizing the EHC 12, for example, prior to the start of the internal combustion engine 10, exhaust gas emission can be reduced during and immediately after the start of the internal combustion engine 10. A temperature sensor 120 is attached to the EHC 12 in this example to detect a temperature correlated to the temperature of the exhaust gas control catalyst 130. As the temperature correlated to the temperature of the exhaust gas control catalyst 130, the temperature sensor 120 may detect an ambient temperature in the inner tube 16 or a temperature of the electrode 17. A detection signal from the temperature sensor 120 is input to the E-ECU 40.

Figure 3:
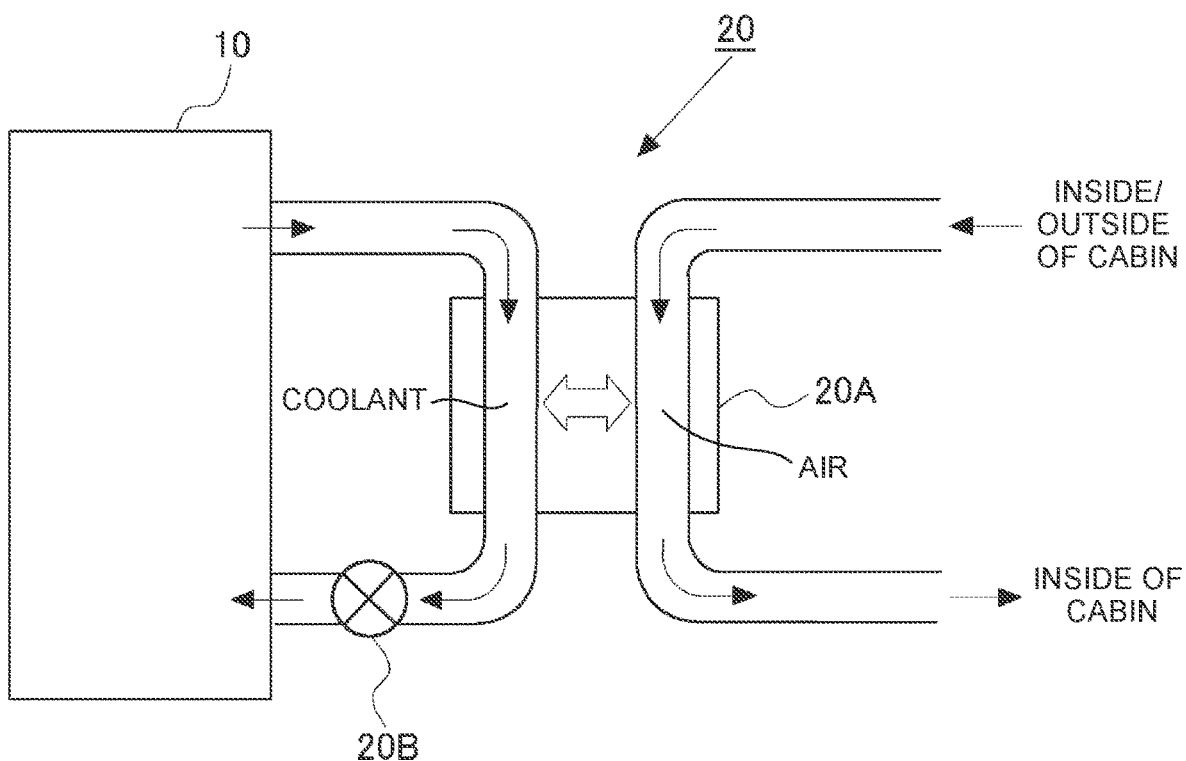
FIG. 3 is a diagram illustrating the overall structure of an air conditioner.

Referring back to FIG. 1, the air conditioner 20 is mounted on the vehicle 100. The air conditioner 20 is a device configured to heat the cabin by using heat released from the internal combustion engine 10 (exhaust heat) when the internal combustion engine 10 operates. For example, the air conditioner 20 includes a heat exchanger 20A and an on-off valve 20B as illustrated in FIG. 3. The heat exchanger 20A exchanges heat between heating air and a coolant circulating through the internal combustion engine 10. In this example, the heat exchanger 20A transfers heat to the heating air from the coolant that absorbs heat radiated from the internal combustion engine 10. The on-off valve 20B interrupts or passes a flow of the coolant from the internal combustion engine 10 to the heat exchanger 20A. The on-off valve 20B is opened when the heating by the air conditioner 20 is needed, and is closed when the heating by the air conditioner 20 is not needed.

The air conditioner 20 may also have a function of cooling the cabin. In this case, the air conditioner 20 may further include a compressor, a condenser, a receiver drier, an expansion valve, and an evaporator. The compressor compresses refrigerant by using the power of the internal combustion engine 10. The condenser cools the refrigerant compressed by the compressor. The receiver drier temporarily stores the refrigerant cooled by the condenser. The expansion valve gasifies the refrigerant. The evaporator exchanges heat between cooling air and the refrigerant. The air conditioner having this structure may be mounted on the vehicle 100 separately from the air conditioner 20.

The vehicle 100 having the configuration described above includes an electronic control unit (ECU) 30 configured to control the air conditioner 20, and an ECU 40 configured to control the internal combustion engine 10. The ECU 30 configured to control the air conditioner 20 is hereinafter referred to as "A-ECU 30". The ECU 40 configured to control the internal combustion engine 10 is hereinafter referred to as "E-ECU 40". The A-ECU 30 and the E-ECU 40 may be implemented by one ECU.

The E-ECU 40 controls the internal combustion engine 10 and its auxiliary devices (for example, the EHC 12, a starter motor, an alternator, an oil pump, or a water pump) in response to a user's driving operation and/or based on detection signals from various sensors mounted on the vehicle 100. In this example, detection signals from a coolant temperature sensor 10a attached to the internal combustion engine 10 and the temperature sensor 120 attached to the EHC 12 are input to the E-ECU 40. The coolant temperature sensor 10a detects a temperature of the coolant of the internal combustion engine 10.

The A-ECU 30 controls the air conditioner 20 in response to an operation on, for example, an air-conditioning operation panel provided in the cabin, or a remote signal from the remote controller 200. A detection signal from a cabin temperature sensor 22 is input to the A-ECU 30. The cabin temperature sensor 22 detects a temperature in the cabin.

Hardware Configurations of A-ECU and Remote Controller

Figure 4:
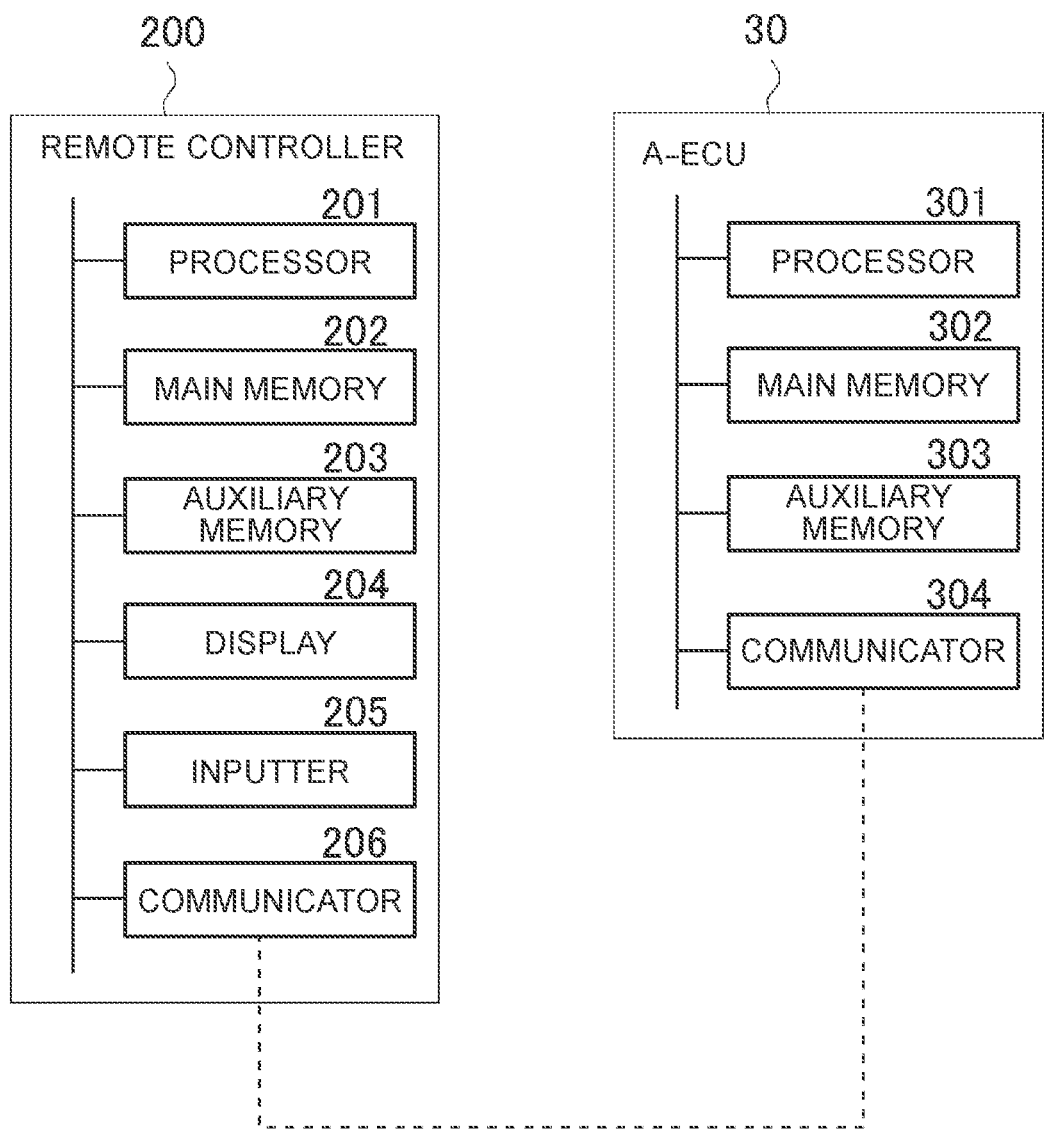
FIG. 4 is a diagram illustrating the hardware configurations of an air-conditioner electronic control unit (A-ECU) and a remote controller.

The hardware configurations of the A-ECU 30 and the remote controller 200 are described with reference to FIG. 4.

As described above, the A-ECU 30 is a computer configured to control the air conditioner 20. The A-ECU 30 includes a processor 301, a main memory 302, an auxiliary memory 303, and a communicator 304. Those components are connected together by a bus. The main memory 302 and the auxiliary memory 303 are computer-readable recording media. The hardware configuration of the A-ECU 30 is not limited to the configuration in the example illustrated in FIG. 4, and any component may be omitted, replaced, or added as appropriate. The A-ECU 30 implements functions suited to predetermined purposes such that the processor 301 executes programs stored in the recording medium by loading the programs on a working area of the main memory 302 and functional units are controlled through the execution of the programs.

Examples of the processor 301 include a central processing unit (CPU) and a digital signal processor (DSP). The processor 301 controls the A-ECU 30, and performs calculations in various information processes. For example, the main memory 302 includes a random access memory (RAM) and a read only memory (ROM). Examples of the auxiliary memory 303 include an erasable programmable ROM (EPROM) and a hard disk drive (HDD). The auxiliary memory 303 may include a removable medium, that is, a portable recording medium. Examples of the removable medium include a universal serial bus (USB) memory, a compact disc (CD), and a digital versatile disc (DVD).

The auxiliary memory 303 stores various programs, various types of data, and various tables in the recording medium in a readable and writable manner. The auxiliary memory 303 also stores an operating system (OS). Those pieces of information may partially or entirely be stored in the main memory 302. Information stored in the main memory 302 may be stored in the auxiliary memory 303.

The communicator 304 transmits and receives information between external devices and the A-ECU 30. Examples of the communicator 304 include a wireless communication circuit for wireless communication. For example, the wireless communication circuit performs data communication with the remote controller 200 in conformity with Bluetooth (registered trademark) Low Energy (hereinafter referred to as "BLE"). The wireless communication circuit may perform wireless communication with the remote controller 200 by using, for example, near field communication (NFC), ultra-wideband (UWB), or Wi-Fi (registered trademark). The wireless communication circuit may be connected to a network by using a mobile communication service such as 5th Generation (5G) or Long Term Evolution (LTE). In this case, the network is a wide area network (WAN) such as the Internet that is a worldwide public communication network, or a telephone communication network for mobile phones or the like.

A series of processes to be executed by the A-ECU 30 having the configuration described above may be executed by hardware or software.

As described above, the remote controller 200 is a small computer for remotely operating the air conditioner 20. The computer is a small computer that can be carried by the user, such as a smart key or other electronic keys (portable devices), a smartphone, a mobile phone, a tablet terminal, a personal information terminal, or a wearable computer (such as a smart watch). The remote controller 200 may be a personal computer (PC) connected to the A-ECU 30 via a network such as the Internet that is a public communication network.

The remote controller 200 includes a processor 201, a main memory 202, an auxiliary memory 203, a display 204, an inputter 205, and a communicator 206. The processor 201, the main memory 202, and the auxiliary memory 203 are similar to the processor 301, the main memory 302, and the auxiliary memory 303 of the A-ECU 30, and their description is therefore omitted. Examples of the display 204 include a liquid crystal display (LCD) and an electroluminescence (EL) panel. Examples of the inputter 205 include a touch panel or a push-button to be used for inputting characters or other codes, a microphone to be used for inputting voice, and a camera configured to capture moving or static images. Examples of the communicator 206 include a communication circuit configured to access a network by using a mobile communication service to perform data communication with the A-ECU 30. The communicator 206 may communicate with the A-ECU 30 in conformity with the same short-range communication standard as that of the communicator 304 of the A-ECU 30.

A series of processes to be executed by the remote controller 200 having the configuration described above may be executed by hardware or software.

Functional Configuration of A-ECU

Figure 5:
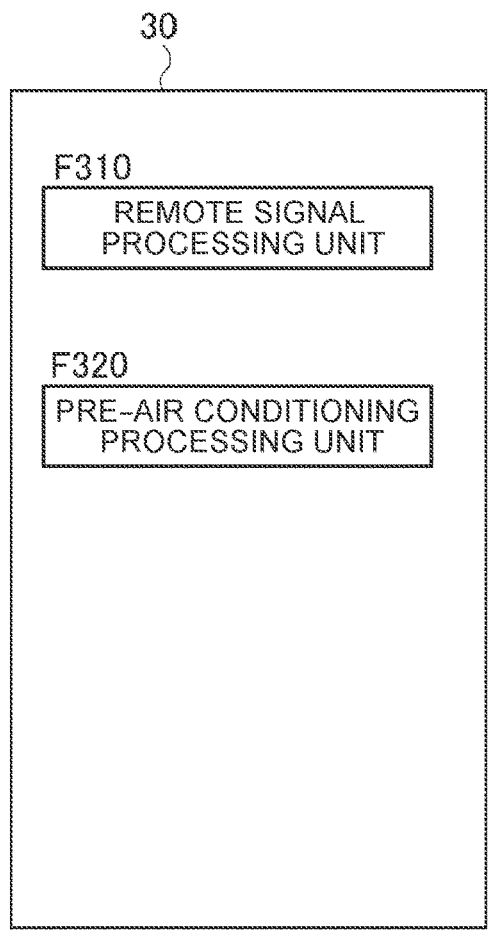
FIG. 5 is a block diagram illustrating the functional configuration of the A-ECU.

Next, the functional configuration of the A-ECU 30 is described with reference to FIG. 5. As illustrated in FIG. 5, the A-ECU 30 in this example includes a remote signal processing unit F310 and a pre-air conditioning processing unit F320 as its functional elements. The remote signal processing unit F310 and the pre-air conditioning processing unit F320 are implemented such that the processor 301 of the A-ECU 30 executes computer programs on the main memory 302. Any one of the remote signal processing unit F310 and the pre-air conditioning processing unit F320 or a part of the remote signal processing unit F310 and the pre-air conditioning processing unit F320 may be implemented by a hardware circuit.

When the communicator 304 receives a remote signal transmitted from the remote controller 200, the remote signal processing unit F310 predicts whether warming of the EHC 12 is executable prior to pre-air conditioning. The "warming of the EHC 12" is an operation of increasing the temperature of the exhaust gas control catalyst 130 to the active temperature by energizing the EHC 12. The "remote signal" contains a target temperature in the cabin and an expected traveling start time of the vehicle 100.

The remote signal processing unit F310 performs the prediction based on a temperature in the cabin before the start of preheating, a temperature of the internal combustion engine 10 before the start of the preheating (before the start of the internal combustion engine 10), a temperature of the exhaust gas control catalyst 130 before the start of the warming of the EHC 12, and a starting time margin. In this example, a detection signal from the cabin temperature sensor 22 is used as the temperature in the cabin. A detection signal from the coolant temperature sensor 10a is used as the temperature of the internal combustion engine 10. A detection signal from the temperature sensor 120 is used as the temperature of the exhaust gas control catalyst 130. The detection signals from the coolant temperature sensor 10a and the temperature sensor 120 are acquired via the E-ECU 40. The remote signal processing unit F310 may directly acquire the detection signals from the coolant temperature sensor 10a and the temperature sensor 120 by connecting the coolant temperature sensor 10a and the temperature sensor 120 to the A-ECU 30 in advance. The temperature of the exhaust gas control catalyst 130 before the start of the warming of the EHC 12 may be estimated based on a temperature of the exhaust gas control catalyst 130 immediately before the stop of a previous operation of the internal combustion engine 10, and an elapsed period from the stop of the previous operation of the internal combustion engine 10. The starting time margin is a time margin from the time of reception of the remote signal to the expected traveling start time.

Figure 6:
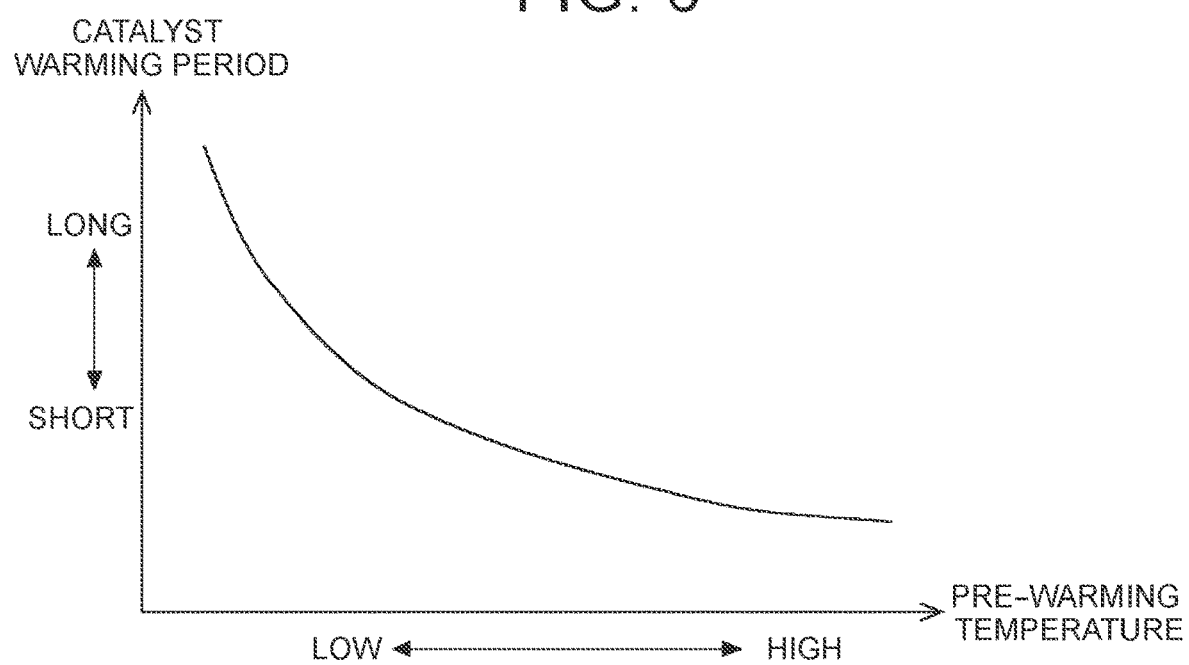
FIG. 6 is a diagram illustrating a correlation between a pre-warming temperature and a catalyst warming period.
Figure 7:
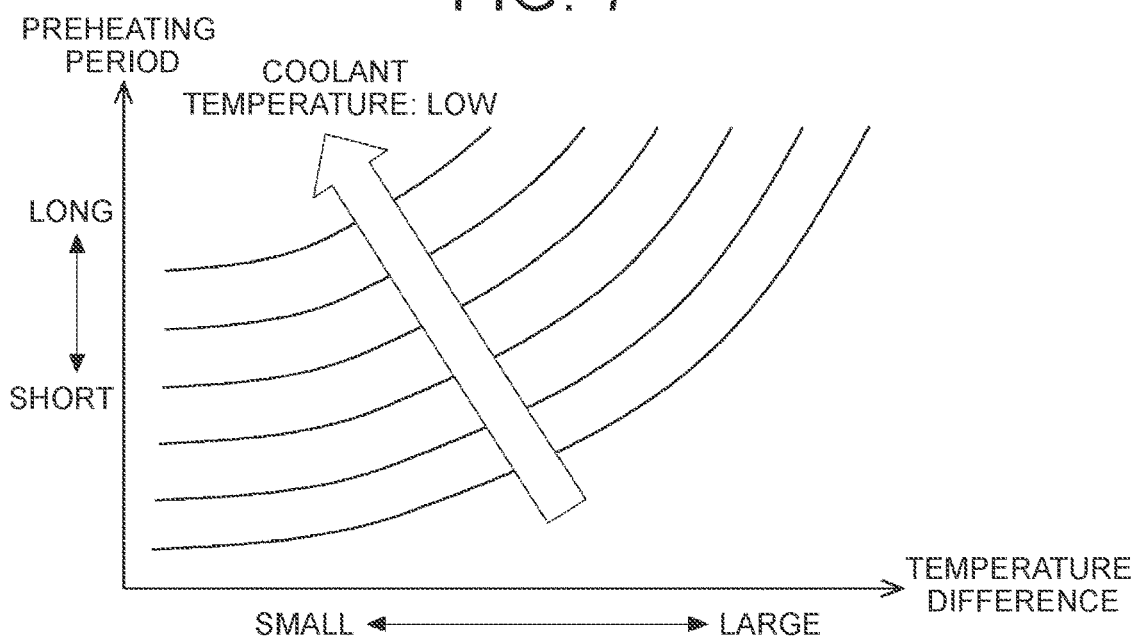
FIG. 7 is a diagram illustrating a correlation among a temperature difference, a coolant temperature, and a pre-heating period.

A procedure of the prediction is described in detail. The remote signal processing unit F310 first calculates an estimated period required to warm the EHC 12 (catalyst warming period), and an estimated period required to increase the temperature in the cabin to the target temperature (preheating period). The catalyst warming period is correlated to the temperature of the exhaust gas control catalyst 130 before the start of the warming of the EHC 12. For example, as illustrated in FIG. 6, when the temperature of the exhaust gas control catalyst 130 before the start of the warming of the EHC 12 (pre-warming temperature) is low, the catalyst warming period tends to be longer than the catalyst warming period when the pre-warming temperature is high. Therefore, the remote signal processing unit F310 may calculate the catalyst warming period by accessing a map showing the correlation illustrated in FIG. 6 using the detection signal from the temperature sensor 120 as an argument. The preheating period is correlated to, for example, a temperature difference between the target temperature and the temperature in the cabin before the start of the preheating, and the temperature of the internal combustion engine 10 before the start of the preheating. For example, as illustrated in FIG. 7, the preheating period tends to be longer as the temperature difference between the target temperature and the temperature in the cabin before the start of the preheating (temperature difference) increases and as the temperature of the internal combustion engine 10 before the start of the preheating (coolant temperature) decreases. Therefore, the remote signal processing unit F310 may calculate the preheating period by accessing a map showing the correlation illustrated in FIG. 7 using, as arguments, a temperature difference between the target temperature and the detection signal from the cabin temperature sensor 22, and the detection signal from the coolant temperature sensor 10a.

When the catalyst warming period and the preheating period are calculated, the remote signal processing unit F310 calculates the sum of the catalyst warming period and the preheating period (reference required period). When the reference required period is equal to or shorter than the starting time margin, the remote signal processing unit F310 predicts that the warming of the EHC 12 is executable prior to the preheating.

When it is predicted that the warming of the EHC 12 can be completed before the start of the preheating, an instruction containing an instruction to execute the warming of the EHC 12 and an instruction to execute the preheating (may hereinafter be referred to as "first execution instruction") is sent from the remote signal processing unit F310 to the pre-air conditioning processing unit F320. The first execution instruction contains information related to the reference required period, and the target temperature and the expected traveling start time specified in the remote signal.

When the reference required period is longer than the starting time margin, the remote signal processing unit F310 predicts that the warming of the EHC 12 cannot be completed before the start of the preheating. In this case, the remote signal processing unit F310 first determines whether the preheating period is equal to or shorter than the starting time margin. When the preheating period is equal to or shorter than the starting time margin, the remote signal processing unit F310 transmits a first selection request signal to the remote controller 200 via the communicator 304. The "first selection request signal" prompts the user to select whether to permit execution of the preheating. The first selection request signal contains information for notifying the user that the warming of the EHC 12 cannot be completed before the execution of the preheating. That is, the first selection request signal prompts the user to select whether to permit execution of the preheating before the completion of the warming of the EHC 12.

When a signal for permitting execution of the preheating is returned from the remote controller 200 in response to the first selection request signal, the signal is sent to the remote signal processing unit F310 via the communicator 304. In this case, the remote signal processing unit F310 sends an instruction containing an instruction to execute the preheating (may hereinafter be referred to as "second execution instruction") to the pre-air conditioning processing unit F320. The second execution instruction contains information related to the preheating period, and the target temperature and the expected traveling start time specified in the remote signal.

When a signal for rejecting execution of the preheating is returned from the remote controller 200 in response to the first selection request signal, the remote signal processing unit F310 transmits a change request signal to the remote controller 200 via the communicator 304. The "change request signal" prompts the user of the vehicle 100 to make a selection as to whether the target temperature can be changed to a first reachable temperature. The change request signal contains information for notifying the user that the target temperature needs to be changed to perform the preheating after the completion of the warming of the EHC 12. That is, the change request signal prompts the user to select whether to permit execution of the preheating with the target temperature changed after the completion of the warming of the EHC 12. The "first reachable temperature" is a temperature in the cabin that is predicted to reach before the expected traveling start time under the assumption that the preheating of the cabin is started from an estimated time of the completion of the warming of the EHC 12. The first reachable temperature is calculated based on the temperature in the cabin before the start of the preheating, the temperature of the internal combustion engine 10 before the start of the preheating, and a time margin from the estimated time of the completion of the warming of the EHC 12 to the expected traveling start time (preheating time margin). When the temperature in the cabin before the start of the preheating is low, the first reachable temperature tends to be lower than the first reachable temperature when the temperature in the cabin before the start of the preheating is high. When the temperature of the internal combustion engine 10 before the start of the preheating is low, the first reachable temperature tends to be lower than the first reachable temperature when the temperature of the internal combustion engine 10 before the start of the preheating is high. When the preheating time margin is short, the first reachable temperature tends to be lower than the first reachable temperature when the preheating time margin is long. Those correlations may be stored in the main memory 302 or the auxiliary memory 303 of the A-ECU 30 as maps using, as arguments, a detection signal from the cabin temperature sensor 22 before the start of the preheating, a detection signal from the coolant temperature sensor 10a before the start of the preheating, and the preheating time margin. In this case, the remote signal processing unit F310 may derive the first reachable temperature by accessing the maps using, as arguments, the detection signal from the cabin temperature sensor 22 before the start of the preheating, the detection signal from the coolant temperature sensor 10a before the start of the preheating, and the preheating time margin.

When a signal for permitting change of the target temperature to the first reachable temperature is returned from the remote controller 200 in response to the change request signal, the signal is sent to the remote signal processing unit F310 via the communicator 304. In this case, the remote signal processing unit F310 sends, to the pre-air conditioning processing unit F320, a first execution instruction containing the changed target temperature (first reachable temperature) in place of the target temperature specified in the remote signal.

When a signal for rejecting change of the target temperature to the first reachable temperature is returned from the remote controller 200 in response to the change request signal, the remote signal processing unit F310 cancels the preheating request.

When it is predicted that the warming of the EHC 12 cannot be completed before the start of the preheating and the preheating period is equal to or shorter than the starting time margin, the change request signal may be transmitted to the remote controller 200 in place of the first selection request signal.

In a case where the reference required period is longer than the starting time margin, when the preheating period is longer than the starting time margin, the remote signal processing unit F310 transmits a second selection request signal to the remote controller 200. The "second selection request signal" prompts the user to select whether to permit execution of the preheating of cabin with the target temperature changed to a second reachable temperature. The second selection request signal contains information for notifying the user that the warming of the EHC 12 cannot be completed before the execution of the preheating. That is, the second selection request signal prompts the user to select whether to permit execution of the preheating with the target temperature changed before the completion of the warming of the EHC 12. The "second reachable temperature" is a temperature in the cabin that is predicted to reach before the expected traveling start time under the assumption that the preheating of the cabin is started immediately. The second reachable temperature is calculated based on the temperature in the cabin before the start of the preheating, the temperature of the internal combustion engine 10 before the start of the preheating, and the starting time margin. When the temperature in the cabin before the start of the preheating is low, the second reachable temperature tends to be lower than the second reachable temperature when the temperature in the cabin before the start of the preheating is high. When the temperature of the internal combustion engine 10 before the start of the preheating is low, the second reachable temperature tends to be lower than the second reachable temperature when the temperature of the internal combustion engine 10 before the start of the preheating is high. When the starting time margin is short, the second reachable temperature tends to be lower than the second reachable temperature when the starting time margin is long. Those correlations may be stored in the main memory 302 or the auxiliary memory 303 of the A-ECU 30 as maps using, as arguments, a detection signal from the cabin temperature sensor 22 before the start of the preheating, a detection signal from the coolant temperature sensor 10a before the start of the preheating, and the starting time margin. In this case, the remote signal processing unit F310 may derive the second reachable temperature by accessing the maps using, as arguments, the detection signal from the cabin temperature sensor 22 before the start of the preheating, the detection signal from the coolant temperature sensor 10a before the start of the preheating, and the starting time margin.

When a signal for permitting execution of the preheating with the target temperature changed is returned from the remote controller 200 in response to the second selection request signal, the signal is sent to the remote signal processing unit F310 via the communicator 304. In this case, the remote signal processing unit F310 sends, to the pre-air conditioning processing unit F320, a second execution instruction containing the changed target temperature (second reachable temperature) in place of the target temperature specified in the remote signal.

When a signal for rejecting execution of the preheating with the target temperature changed is returned from the remote controller 200 in response to the second selection request signal, the remote signal processing unit F310 cancels the preheating request.

The pre-air conditioning processing unit F320 performs preheating of the cabin in response to the first execution instruction or the second execution instruction sent from the remote signal processing unit F310. When the preheating of the cabin is performed in response to the first execution instruction, the pre-air conditioning processing unit F320 calculates a time to start the warming of the EHC 12 (may hereinafter be referred to as "warming start time") based on the reference required period and the expected traveling start time contained in the first execution instruction. The warming start time is a time going back from the expected traveling start time by the reference required period. The pre-air conditioning processing unit F320 starts a process of warming the EHC 12 at the warming start time. Specifically, the pre-air conditioning processing unit F320 sends a request to start the warming of the EHC 12 to the E-ECU 40. The E-ECU 40 that receives the warming start request performs a process of starting energization of the EHC 12 from the battery 55. The catalyst support 13 of the EHC 12 generates heat to warm the exhaust gas control catalyst 130. When the detection signal from the temperature sensor 120 (temperature of the exhaust gas control catalyst 130) reaches the active temperature, the E-ECU 40 terminates the energization of the EHC 12 from the battery 55, and notifies the A-ECU 30 that the warming of the EHC 12 is completed. In the A-ECU 30 notified that the warming of the EHC 12 is completed, the pre-air conditioning processing unit F320 starts a preheating process. Specifically, the pre-air conditioning processing unit F320 sends a request to start the internal combustion engine 10 to the E-ECU 40. The E-ECU 40 that receives the starting request performs a process of starting the internal combustion engine 10. For example, the starting process involves a process of operating the starter motor, a process of operating a fuel injection valve, and a process of operating a spark plug. When the start of the internal combustion engine 10 is completed, the E-ECU 40 notifies the A-ECU 30 that the start of the internal combustion engine 10 is completed. In the A-ECU 30 notified that the start of the internal combustion engine 10 is completed, the pre-air conditioning processing unit F320 starts heating the cabin by the air conditioner 20. Specifically, the A-ECU 30 opens the on-off valve 20B. The heat exchanger 20A exchanges heat between heating air and the coolant that absorbs heat radiated from the internal combustion engine 10, thereby heating the heating air. The A-ECU 30 increases the temperature in the cabin to the target temperature before the expected traveling start time by controlling, for example, an amount of heating air to be blown to the cabin or an amount of heating air to be subjected to heat exchange at the heat exchanger 20A based on the target temperature. By performing the preheating of the cabin in response to the first execution instruction as described above, the warming of the EHC 12 can be completed before the start of the internal combustion engine 10. Thus, the preheating process can be performed while causing the EHC 12 to control exhaust gas discharged from the internal combustion engine 10 during and after the start of the internal combustion engine 10.

When the preheating of the cabin is performed in response to the second execution instruction, the pre-air conditioning processing unit F320 calculates a preheating start time based on the preheating period and the expected traveling start time contained in the second execution instruction. The preheating start time is a time going back from the expected traveling start time by the preheating period. The pre-air conditioning processing unit F320 starts the preheating process at the preheating start time. An execution procedure of the preheating process is similar to the procedure in the case where the preheating of the cabin is performed in response to the first execution instruction. In this case, the temperature in the cabin can be increased to the target temperature before the expected traveling start time though the warming of the EHC 12 cannot be completed before the start of the internal combustion engine 10.

When the preheating of the cabin is performed in response to the second execution instruction, the pre-air conditioning processing unit F320 may immediately start the process of warming the EHC 12 at the timing when the second execution instruction is received from the remote signal processing unit F310. In this case, it is difficult to complete the warming of the EHC 12 before the start of the preheating process (before the start of the internal combustion engine 10), but the warming of the EHC 12 can be completed earlier after the start of the preheating process. As a result, it is possible to minimize an increase in exhaust gas emission along with the execution of the preheating process.

Functional Configuration of Remote Controller

Figure 8:
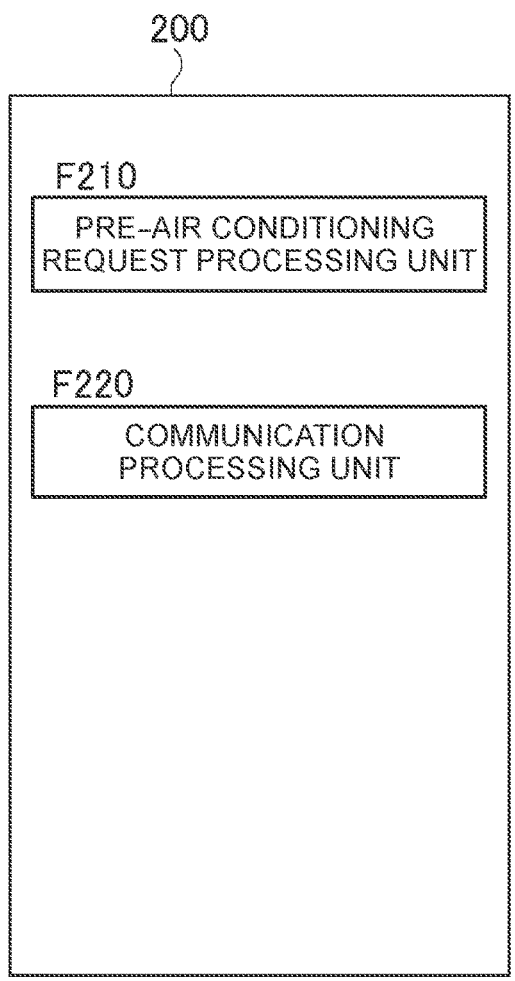
FIG. 8 is a block diagram illustrating the functional configuration of the remote controller.

Next, the functional configuration of the remote controller 200 is described with reference to FIG. 8. As illustrated in FIG. 8, the remote controller 200 in this example includes a pre-air conditioning request processing unit F210 and a communication processing unit F220 as its functional elements. The pre-air conditioning request processing unit F210 and the communication processing unit F220 are implemented such that the processor 201 of the remote controller 200 executes computer programs on the main memory 202. Any one of the pre-air conditioning request processing unit F210 and the communication processing unit F220 or a part of the pre-air conditioning request processing unit F210 and the communication processing unit F220 may be implemented by a hardware circuit.

When the user makes a preheating request operation on the remote controller 200, the pre-air conditioning request processing unit F210 acquires a target temperature in the cabin and an expected traveling start time of the vehicle 100. For example, the pre-air conditioning request processing unit F210 displays a setting screen for the target temperature and the expected traveling start time on the touch panel of the inputter 205, thereby prompting the user to set the target temperature and the expected traveling start time. The target temperature and the expected traveling start time acquired by the pre-air conditioning request processing unit F210 are sent to the communication processing unit F220.

When the communicator 206 receives the first selection request signal, the pre-air conditioning request processing unit F210 performs a process of prompting the user of the vehicle 100 to select whether to permit execution of the preheating before the completion of the warming of the EHC 12. For example, the pre-air conditioning request processing unit F210 may display buttons on the touch panel of the inputter 205 for selection as to whether to permit or reject execution of the preheating before the completion of the warming of the EHC 12. When the user selects the permission button or the rejection button on the touch panel, the selection result is sent from the pre-air conditioning request processing unit F210 to the communication processing unit F220.

When the communicator 206 receives the change request signal, the pre-air conditioning request processing unit F210 performs a process of prompting the user of the vehicle 100 to make a selection as to whether the target temperature can be changed. For example, the pre-air conditioning request processing unit F210 may display buttons on the touch panel of the inputter 205 for selection as to whether to permit or reject change of the target temperature. At this time, the pre-air conditioning request processing unit F210 also performs a process of presenting the changed target temperature (first reachable temperature) to the user. When the user selects the permission button or the rejection button on the touch panel, the selection result is sent from the pre-air conditioning request processing unit F210 to the communication processing unit F220.

When the communicator 206 receives the second selection request signal, the pre-air conditioning request processing unit F210 performs a process of prompting the user of the vehicle 100 to select whether to permit execution of the preheating with the target temperature changed before the completion of the warming of the EHC 12. For example, the pre-air conditioning request processing unit F210 may display buttons on the touch panel of the inputter 205 for selection as to whether to permit or reject execution of the preheating with the target temperature changed before the completion of the warming of the EHC 12. At this time, the pre-air conditioning request processing unit F210 also performs a process of presenting the changed target temperature (second reachable temperature) to the user. When the user selects the permission button or the rejection button on the touch panel, the selection result is sent from the pre-air conditioning request processing unit F210 to the communication processing unit F220.

The communication processing unit F220 has a function of transmitting various signals to the A-ECU 30. For example, when the target temperature and the expected traveling start time are received from the pre-air conditioning request processing unit F210, the communication processing unit F220 transmits a remote signal containing the target temperature and the expected traveling start time to the A-ECU 30 via the communicator 206. When the user's selection result responding to the first selection request signal, the second selection request signal, or the change request signal is received from the pre-air conditioning request processing unit F210, the communication processing unit F220 transmits a signal indicating the selection result to the A-ECU 30 via the communicator 206.

Process Flow

Figure 9:
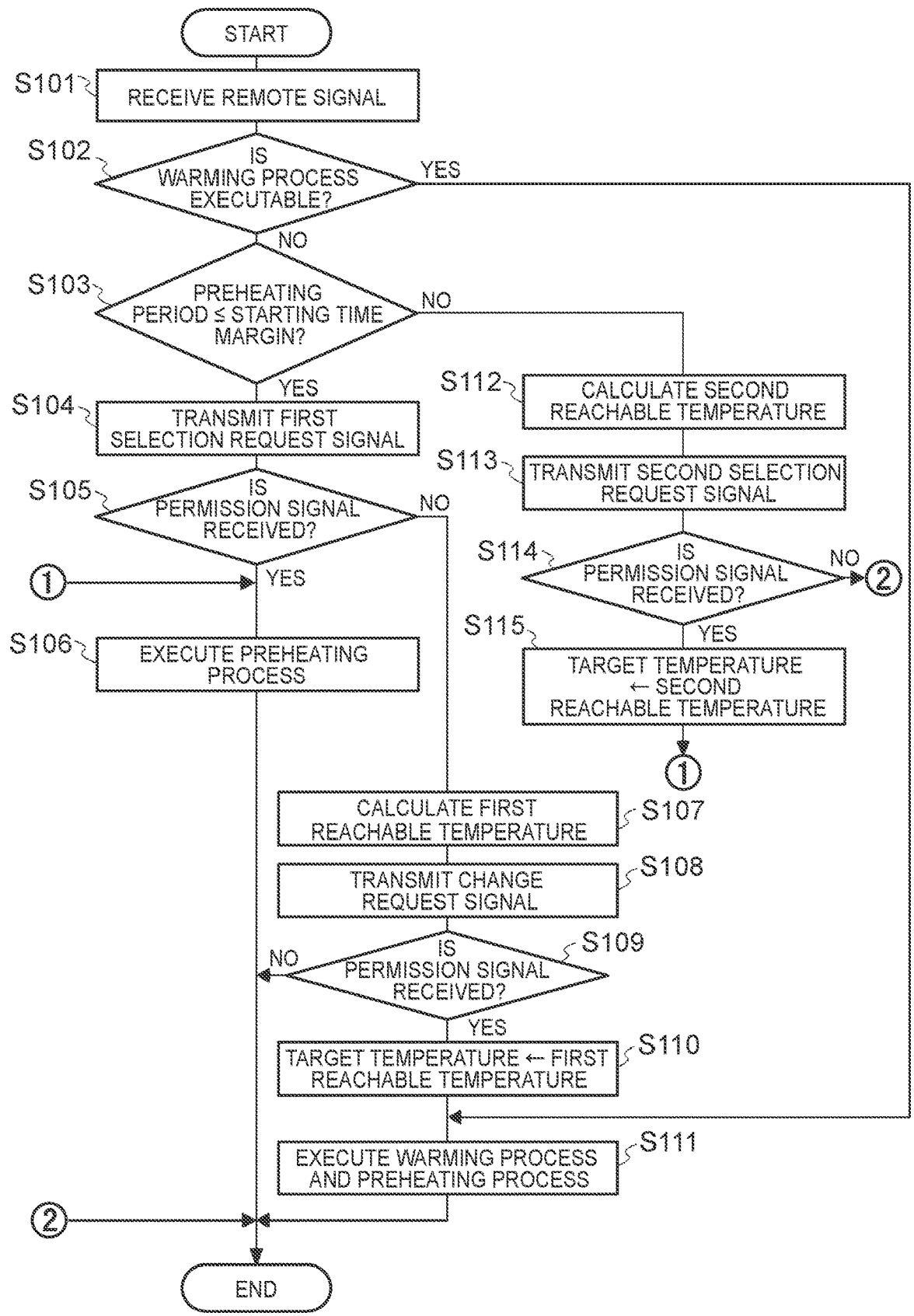
FIG. 9 is a flowchart illustrating a flow of a process to be performed by the A-ECU when a remote signal is received.

Next, a flow of a process to be performed by the A-ECU 30 according to this embodiment is described with reference to FIG. 9. FIG. 9 is a flowchart illustrating a flow of a process to be performed by the A-ECU 30 when a remote signal is received from the remote controller 200.

In FIG. 9, when the communicator 304 receives the remote signal from the remote controller 200 (Step S101), the remote signal processing unit F310 predicts whether the process of warming the EHC 12 is executable before execution of the preheating process (Step S102). This prediction process is executed along a process flow illustrated in FIG. 10.

In FIG. 10, the remote signal processing unit F310 calculates a catalyst warming period (Step S1021). At this time, the remote signal processing unit F310 calculates the catalyst warming period by accessing the map illustrated in FIG. 6 using a detection signal from the temperature sensor 120 as an argument. Then, the remote signal processing unit F310 calculates a preheating period (Step S1022). At this time, the remote signal processing unit F310 calculates the preheating period by accessing the map illustrated in FIG. 7 using, as arguments, a temperature difference between a target temperature and a detection signal from the cabin temperature sensor 22, and a detection signal from the coolant temperature sensor 10a. When the catalyst warming period and the preheating period are calculated, the remote signal processing unit F310 calculates a reference required period by adding the preheating period to the catalyst warming period (Step S1023). The remote signal processing unit F310 calculates a starting time margin from a time of reception of the remote signal to an expected traveling start time (Step S1024).

The remote signal processing unit F310 determines whether the reference required period calculated in Step S1023 is equal to or shorter than the starting time margin calculated in Step S1024 (Step S1025). When the reference required period is equal to or shorter than the starting time margin ("yes" in Step S1025), the remote signal processing unit F310 predicts that the process of warming the EHC 12 is executable before the execution of the preheating process (Step S1026). When the reference required period is longer than the starting time margin ("no" in Step S1025), the remote signal processing unit F310 predicts that the process of warming the EHC 12 is not executable before the execution of the preheating process (Step S1027).

Referring back to FIG. 9, when it is predicted that the process of warming the EHC 12 is executable before the execution of the preheating process ("yes" in Step S102), the remote signal processing unit F310 sends a first execution instruction to the pre-air conditioning processing unit F320. In this case, the target temperature contained in the first execution instruction is an initial target temperature specified in the remote signal. The pre-air conditioning processing unit F320 sequentially executes the process of warming the EHC 12 and the preheating process in response to the first execution instruction (Step S111). That is, the pre-air conditioning processing unit F320 first executes the process of warming the EHC 12, and executes the preheating process after completion of the warming of the EHC 12. The process of warming the EHC 12 is started at a warming start time determined based on the reference required period and the expected traveling start time. The preheating process is started when the warming of the EHC 12 is completed. Thus, the preheating of the cabin can be performed while causing the EHC 12 to control exhaust gas discharged from the internal combustion engine 10. That is, it is possible to suppress an increase in exhaust gas emission along with the execution of the preheating process.

When the result of the determination in Step S102 is "no" (it is predicted that the process of warming the EHC 12 is not executable before the execution of the preheating process), the remote signal processing unit F310 determines whether the preheating period is equal to or shorter than the starting time margin (Step S103). The preheating period and the starting time margin are determined in Step S102 (processing routine of FIG. 10). When the preheating period is equal to or shorter than the starting time margin ("yes" in Step S103), the remote signal processing unit F310 transmits a first selection request signal to the remote controller 200 via the communicator 304 (Step S104). As described above, the first selection request signal prompts the user to select whether to permit execution of the preheating before the completion of the warming of the EHC 12.

When the communicator 206 of the remote controller 200 receives the first selection request signal, the pre-air conditioning request processing unit F210 performs the process of prompting the user to select whether to permit execution of the preheating before the completion of the warming of the EHC 12. When the user makes a selection to permit or reject execution of the preheating before the completion of the warming of the EHC 12, the selection result is transmitted to the A-ECU 30.

When the communicator 304 receives a signal returned from the remote controller 200 in response to the first selection request signal, the signal is sent to the remote signal processing unit F310 via the communicator 304. The remote signal processing unit F310 determines whether the signal is a permission signal (signal for permitting execution of the preheating before the completion of the warming of the EHC 12) (Step S105). When the signal is the permission signal ("yes" in Step S105), the remote signal processing unit F310 sends a second execution instruction to the pre-air conditioning processing unit F320. The target temperature contained in the second execution instruction is the initial target temperature specified in the remote signal. The pre-air conditioning processing unit F320 executes the preheating process in response to the second execution instruction (Step S106). That is, the pre-air conditioning processing unit F320 starts the preheating process at a preheating start time determined based on the preheating period and the expected traveling start time. It is difficult to cause the EHC 12 to control exhaust gas discharged from the internal combustion engine 10 immediately after the start of the preheating process, but the temperature in the cabin can be increased to the target temperature before the expected traveling start time. The pre-air conditioning processing unit F320 may immediately start the process of warming the EHC 12 at the timing when the second execution instruction is received. In this case, it is difficult to complete the warming of the EHC 12 before the preheating start time, but the exhaust gas control catalyst 130 can be activated earlier than a case where the warming process is not performed. Thus, it is possible to minimize an increase in exhaust gas emission along with the execution of the preheating process.

When the signal returned from the remote controller 200 in response to the first selection request signal is a rejection signal ("no" in Step S105), the remote signal processing unit F310 calculates a first reachable temperature (Step S107). As described above, the first reachable temperature is a temperature in the cabin that is predicted to reach before the expected traveling start time under the assumption that the preheating process is started when the warming of the EHC 12 is completed. The first reachable temperature is calculated based on the maps using, as arguments, a detection signal from the cabin temperature sensor 22, a detection signal from the coolant temperature sensor 10a, and a preheating time margin.

When the first reachable temperature is calculated, the remote signal processing unit F310 transmits a change request signal to the remote controller 200 via the communicator 304 (Step S108). As described above, the change request signal prompts the user to select whether to permit execution of the preheating with the target temperature changed after the completion of the warming of the EHC 12. The change request signal contains information indicating the changed target temperature (first reachable temperature).

When the communicator 206 of the remote controller 200 receives the change request signal, the pre-air conditioning request processing unit F210 performs the process of prompting the user to select whether to permit execution of the preheating with the target temperature changed after the completion of the warming of the EHC 12. At this time, the pre-air conditioning request processing unit F210 also performs the process of presenting the changed target temperature (first reachable temperature) to the user. When the user makes a selection to permit or reject execution of the preheating with the target temperature changed after the completion of the warming of the EHC 12, the selection result is transmitted to the A-ECU 30.

When the communicator 304 receives a signal returned from the remote controller 200 in response to the change request signal, the signal is sent to the remote signal processing unit F310 via the communicator 304. The remote signal processing unit F310 determines whether the signal is a permission signal (signal for permitting execution of the preheating with the target temperature changed after the completion of the warming of the EHC 12) (Step S109). When the signal is the permission signal ("yes" in Step S109), the remote signal processing unit F310 changes the target temperature of the preheating process to the first reachable temperature from the initial target temperature specified in the remote signal (Step S110). Then, the remote signal processing unit F310 sends a first execution instruction to the pre-air conditioning processing unit F320. The target temperature contained in the first execution instruction is the changed target temperature (first reachable temperature). The pre-air conditioning processing unit F320 sequentially executes the warming process and the preheating process in response to the first execution instruction (Step S111). Thus, the preheating process can be executed while causing the EHC 12 to control exhaust gas discharged from the internal combustion engine 10 though the temperature in the cabin that can reach before the expected traveling start time is lower than the initial target temperature. As a result, it is possible to suppress an increase in exhaust gas emission along with the execution of the preheating process.

When the signal returned from the remote controller 200 in response to the change request signal is a rejection signal ("no" in Step S109), the execution of this processing routine is terminated (the preheating request is canceled).

When the result of the determination in Step S103 is "no" (the preheating period is longer than the starting time margin), the remote signal processing unit F310 calculates a second reachable temperature (Step S112). As described above, the second reachable temperature is a temperature in the cabin that is predicted to reach before the expected traveling start time under the assumption that the preheating process is started immediately. The second reachable temperature is calculated based on the maps using, as arguments, a detection signal from the cabin temperature sensor 22, a detection signal from the coolant temperature sensor 10a, and a starting time margin.

When the second reachable temperature is calculated, the remote signal processing unit F310 transmits a second selection request signal to the remote controller 200 via the communicator 304 (Step S113). As described above, the second selection request signal prompts the user to select whether to permit execution of the preheating with the target temperature changed before the completion of the warming of the EHC 12. The second selection request signal contains information indicating the changed target temperature (second reachable temperature).

When the communicator 206 of the remote controller 200 receives the second selection request signal, the pre-air conditioning request processing unit F210 performs the process of prompting the user to select whether to permit execution of the preheating with the target temperature changed before the completion of the warming of the EHC 12. At this time, the pre-air conditioning request processing unit F210 also performs the process of presenting the changed target temperature (second reachable temperature) to the user. When the user makes a selection to permit or reject execution of the preheating with the target temperature changed before the completion of the warming of the EHC 12, the selection result is transmitted to the A-ECU 30.

When the communicator 304 receives a signal returned from the remote controller 200 in response to the second selection request signal, the signal is sent to the remote signal processing unit F310 via the communicator 304. The remote signal processing unit F310 determines whether the signal is a permission signal (signal for permitting execution of the preheating with the target temperature changed before the completion of the warming of the EHC 12) (Step S114). When the signal is the permission signal ("yes" in Step S114), the remote signal processing unit F310 changes the target temperature of the preheating process to the second reachable temperature from the initial target temperature specified in the remote signal (Step S115). Then, the remote signal processing unit F310 sends a second execution instruction to the pre-air conditioning processing unit F320. The target temperature contained in the second execution instruction is the changed target temperature (second reachable temperature). The pre-air conditioning processing unit F320 executes the preheating process in response to the second execution instruction (Step S106). It is difficult to cause the EHC 12 to control exhaust gas discharged from the internal combustion engine 10 immediately after the start of the preheating process, and the temperature in the cabin that can reach before the expected traveling start time is lower than the initial target temperature, but the temperature in the cabin can be increased to the extent possible. The pre-air conditioning processing unit F320 may immediately start the process of warming the EHC 12 at the timing when the second execution instruction is received. In this case, it is difficult to complete the warming of the EHC 12 before the preheating start time, but the exhaust gas control catalyst 130 can be activated earlier than a case where the warming process is not performed. Thus, it is possible to minimize an increase in exhaust gas emission along with the execution of the preheating process.

When the signal returned from the remote controller 200 in response to the second selection request signal is a rejection signal ("no" in Step S114), the execution of this processing routine is terminated (the preheating request is canceled).

When the response to the first selection request signal, the change request signal, or the second selection request signal is not received by the A-ECU 30 within a predetermined period, the preheating request may be canceled.

According to the embodiment described above, when the process of warming the EHC 12 is executable before the execution of the preheating process, the preheating process is executed after the completion of the warming of the EHC 12. As a result, it is possible to minimize a decrease in environmental performance along with the execution of the preheating process.

This embodiment is directed to the example in which the cabin is heated (preheated) through the pre-air conditioning. The vehicle control device according to the present disclosure is also applicable to a case where the cabin is cooled (precooled) through the pre-air conditioning. In short, the vehicle control device according to the present disclosure is applicable to a configuration in which the internal combustion engine needs to operate when the pre-air conditioning is performed.

Modified Example

The embodiment described above is directed to the example in which the user is prompted to select whether to permit execution of the pre-air conditioning by transmitting the first selection request signal, the second selection request signal, or the change request signal to the remote controller 200 when the process of warming the EHC 12 is not executable. The pre-air conditioning may automatically be executed without prompting the user to select whether to permit execution of the pre-air conditioning. For example, when the result of the determination in Step S103 is "yes" in the processing routine of FIG. 9, only the process of Step S106 may automatically be executed by omitting the processes of Steps S104 and S105. When the result of the determination in Step S103 is "yes" in the processing routine of FIG. 9, only the processes of Steps S107, S110, and S111 may automatically be executed by omitting the processes of Steps S104 to S106, S108, and S109. When the result of the determination in Step S103 is "no" in the processing routine of FIG. 9, only the processes of Steps S112, S115, and S106 may automatically be executed by omitting the processes of Steps S113 and S114.

According to this modified example, the pre-air conditioning can be executed without bothering the user.

Others

The embodiment and the modified example described above are illustrative in all respects, and the present disclosure may be modified as appropriate without departing from the spirit of the present disclosure. For example, the embodiment and the modified example may be combined if possible.

The processes and means described in the present disclosure may freely be combined without causing any technical contradiction. The process described as being executed by a single device may be executed by a plurality of devices in cooperation. Alternatively, the process described as being executed by different devices may be executed by a single device. For example, a part of the process to be executed by the A-ECU may be executed by the remote controller. In the computer system, the hardware configuration that implements functions may be changed flexibly.

The present disclosure may be embodied such that a computer program that implements the functions described in the embodiment described above is supplied to the A-ECU and is read and executed by one or more processors of the A-ECU. The computer program may be provided to a computer by being stored in a non-transitory computer-readable storage medium connectable to a system bus of the computer, or may be provided to the computer via a network. The non-transitory computer-readable storage medium is a recording medium in which information such as data and programs is stored by an electric, magnetic, optical, mechanical, or chemical action and is readable by a computer or the like. Examples of the recording medium include any types of disk or disc such as magnetic disks (for example, a floppy (registered trademark) disk and a hard disk drive (HDD)) and optical discs (for example, a compact disc read only memory (CD-ROM), a DVD, and a Blu-ray disc). Examples of the recording medium also include a read only memory (ROM), a random access memory (RAM), an EPROM, an electrically erasable programmable ROM (EEPROM), a magnetic card, a flash memory, an optical card, and a solid state drive (SSD).

What is claimed is:

1. A vehicle control device comprising:
a controller including a processor, the controller being configured to execute:
receiving a remote signal from a remote controller used by a user of the vehicle, the remote signal containing a target temperature in a cabin and an expected traveling start time of a vehicle provided by the user of the vehicle;
calculating a catalyst warming period which is an estimated period required to warm, to an active temperature, an electrically heated catalyst disposed in an exhaust passage of an internal combustion engine;
calculating a pre-air conditioning period which is an estimated period required to adjust a temperature in the cabin to the target temperature, the temperature in the cabin being provided by a cabin temperature sensor; and
starting pre-air conditioning of the cabin by starting the internal combustion engine after completion of warming of the electrically heated catalyst when a sum of the catalyst warming period and the pre-air conditioning period is equal to or shorter than a starting time margin from a time of reception of the remote signal to the expected traveling start time.

2. The vehicle control device according to claim 1, wherein the controller is configured to further execute, when the sum of the catalyst warming period and the pre-air conditioning period is longer than the starting time margin:
transmitting, to the remote controller, a signal for prompting the user to select whether to permit execution of the pre-air conditioning of the cabin; and
starting the pre-air conditioning of the cabin by starting the internal combustion engine before the completion of the warming of the electrically heated catalyst when the controller receives a signal for permitting the execution of the pre-air conditioning of the cabin from the remote controller.

3. The vehicle control device according to claim 2, wherein the controller is configured to further execute, when the controller receives a signal for rejecting the execution of the pre-air conditioning of the cabin from the remote controller:
calculating a first reachable temperature which is a temperature in the cabin that is predicted to reach before the expected traveling start time under an assumption that the pre-air conditioning of the cabin is started from a time of the completion of the warming of the electrically heated catalyst;

transmitting, to the remote controller, a signal for prompting the user to change the target temperature to the first reachable temperature; and starting the pre-air conditioning of the cabin by starting the internal combustion engine after the completion of the warming of the electrically heated catalyst when the controller receives a signal for permitting change of the target temperature to the first reachable temperature from the remote controller.

4. The vehicle control device according to claim 3, wherein the controller is configured to calculate the first reachable temperature based on at least one of a temperature in the cabin before a start of the pre-air conditioning of the cabin, a temperature of the internal combustion engine before the start of the pre-air conditioning of the cabin, or a pre-air conditioning time margin from an estimated time of the completion of the warming of the electrically heated catalyst to the expected traveling start time.

5. The vehicle control device according to claim 1, wherein the controller is configured to further execute, when the sum of the catalyst warming period and the pre-air conditioning period is longer than the starting time margin and the pre-air conditioning period is longer than the starting time margin:

calculating a second reachable temperature which is a temperature in the cabin that is predicted to reach before the expected traveling start time under an assumption that the pre-air conditioning of the cabin is started immediately;

transmitting, to the remote controller, a signal for prompting the user to select whether to permit execution of the pre-air conditioning of the cabin with the target temperature changed to the second reachable temperature; and starting the pre-air conditioning of the cabin by immediately starting the internal combustion engine when the controller receives a signal for permitting the execution of the pre-air conditioning of the cabin with the target temperature changed to the second reachable temperature from the remote controller.

6. The vehicle control device according to claim 5, wherein the controller is configured to calculate the second reachable temperature based on at least one of a temperature in the cabin before a start of the pre-air conditioning of the cabin, a temperature of the internal combustion engine before the start of the pre-air conditioning of the cabin, or the starting time margin.

7. The vehicle control device according to claim 1, wherein the controller is configured to start the pre-air conditioning of the cabin by starting the internal combustion engine before the completion of the warming of the electrically heated catalyst when the stun of the catalyst warming period and the pre-air conditioning period is longer than the starting time margin.

8. The vehicle control device according to claim 1, wherein the controller is configured to calculate the catalyst warming period based on a temperature of the electrically heated catalyst before a start of the warming of the electrically heated catalyst.

9. The vehicle control device according to claim 1, wherein the controller is configured to calculate the pre-air conditioning period based on at least one of a temperature difference between the target temperature and a temperature in the cabin before a start of the pre-air conditioning of the cabin, or a temperature of the internal combustion engine before the start of the pre-air conditioning of the cabin.

10. A vehicle control method executed by a computer provided in the vehicle, the method comprising:

receiving, by the computer, a remote signal from a remote controller used by a user of the vehicle, the remote signal containing a target temperature in a cabin and an expected traveling start time of a vehicle provided by the user of the vehicle;

calculating, by the computer, a catalyst warming period, which is an estimated period required to warm, to an active temperature, an electrically heated catalyst disposed in an exhaust passage of an internal combustion engine;

calculating, by the computer, a pre-air conditioning period which is an estimated period required to adjust a temperature in the cabin to the target temperature, the temperature in the cabin being provided by a cabin temperature sensor; and starting, by the computer, pre-air conditioning of the cabin by starting the internal combustion engine after completion of warming of the electrically heated catalyst when a sum of the catalyst warming period and the pre-air conditioning period is equal to or shorter than a starting time margin from a time of reception of the remote signal to the expected traveling start time.

11. The vehicle control method according to claim 10, further comprising:

transmitting, by the computer, when the sum of the catalyst warming period and the pre-air conditioning period is longer than the starting time margin, to the remote controller, a signal for prompting the user to select whether to permit execution of the pre-air conditioning of the cabin; and starting, by the computer, the pre-air conditioning of the cabin by starting the internal combustion engine before the completion of the warming of the electrically heated catalyst when the computer receives a signal for permitting the execution of the pre-air conditioning of the cabin from the remote controller.

12. The vehicle control method according to claim 11, further comprising:

calculating, by the computer, when the computer receives a signal for rejecting the execution of the pre-air conditioning of the cabin from the remote controller, a first reachable temperature which is a temperature in the cabin that is predicted to reach before the expected traveling start time under an assumption that the pre-air conditioning of the cabin is started from a time of the completion of the warming of the electrically heated catalyst;

transmitting, by the computer, to the remote controller, a signal for prompting the user to change the target temperature to the first reachable temperature; and starting, by the computer, the pre-air conditioning of the cabin by starting the internal combustion engine after the completion of the warming of the electrically heated catalyst when the computer receives a signal for permitting change of the target temperature to the first reachable temperature from the remote controller.

13. The vehicle control method according to claim 12, wherein the first reachable temperature is calculated based on at least one of a temperature in the cabin before a start of the pre-air conditioning of the cabin, a temperature of the internal combustion engine before the start of the pre-air conditioning of the cabin, or a pre-air conditioning time margin from an estimated time of the completion of the warning of the electrically heated catalyst to the expected traveling start time.

14. The vehicle control method according to claim 10, further comprising:
    calculating, by the computer, a second reachable temperature which is a temperature in the cabin that is predicted to reach before the expected traveling start time, when the sum of the catalyst warming period and the pre-air conditioning period is longer than the starting time margin, the pre-air conditioning period is longer than the starting time margin, and under an assumption that the pre-air conditioning of the cabin is started immediately;
    transmitting, by the computer, to the remote controller, a signal for prompting the user to select whether to permit execution of the pre-air conditioning with the target temperature changed to the second reachable temperature; and
    starting, by the computer, the pre-air conditioning of the cabin by immediately starting the internal combustion engine when the computer receives a signal for permitting the execution of the pre-air conditioning of the cabin with the target temperature changed to the second reachable temperature from the remote controller.

15. The vehicle control method according to claim 14, wherein the second reachable temperature is calculated based on at least one of a temperature in the cabin before a start of the pre-air conditioning of the cabin, a temperature of the internal combustion engine before the start of the pre-air conditioning of the cabin, or the starting time margin.

16. The vehicle control method according to claim 10, further comprising starting, by the computer, the pre-air conditioning of the cabin by starting the internal combustion engine before the completion of the warming of the electrically heated catalyst when the sum of the catalyst warming period and the pre-air conditioning period is longer than the starting time margin.

17. The vehicle control method according to claim 10, wherein the catalyst warming period is calculated based on a temperature of the electrically heated catalyst before a start of the warming of the electrically heated catalyst.

18. The vehicle control method according to claim 10, wherein the pre-air conditioning period is calculated based on at least one of a temperature difference between the target temperature and a temperature in the cabin before a start of the pre-air conditioning of the cabin, and a temperature of the internal combustion engine before the start of the pre-air conditioning of the cabin.

19. A non-transitory storage medium storing instructions that are executable by a computer and that cause the computer to perform a vehicle control method comprising:
    receiving a remote signal from a remote controller used by a user of the vehicle, the remote signal containing a target temperature in a cabin and an expected traveling start time of a vehicle provided by the user of the vehicle;
    calculating a catalyst warming period, which is an estimated period required to warm, to an active temperature, an electrically heated catalyst disposed in an exhaust passage of an internal combustion engine;
    calculating a pre-air conditioning period which is an estimated period required to adjust a temperature in the cabin to the target temperature, the temperature in the cabin being provided by a cabin temperature sensor; and
    starting pre-air conditioning of the cabin by starting the internal combustion engine after completion of warming of the electrically heated catalyst when a sum of the catalyst warming period and the pre-air conditioning period is equal to or shorter than a starting time margin from a time of reception of the remote signal to the expected traveling start time.

20. A vehicle control system comprising:
    a remote controller to be used by a user of a vehicle, the remote controller being configured to, when a pre-air conditioning request provided by the user of the vehicle containing a target temperature in a cabin and an expected traveling start time of the vehicle is received, transmit a remote signal containing the target temperature and the expected traveling start time; and
    a control device configured to, when the remote signal is received from the remote controller, perform pre-air conditioning of the cabin based on the target temperature and the expected traveling start time, wherein
    the control device includes a controller including a processor configured to, when the remote signal is received:
        calculate a catalyst warming period, which is an estimated period required to warm, to an active temperature, an electrically heated catalyst disposed in an exhaust passage of an internal combustion engine;
        calculate a pre-air conditioning period, which is an estimated period required to adjust a temperature in the cabin to the target temperature, the temperature in the cabin being provided by a cabin temperature sensor; and
        start the pre-air conditioning of the cabin by starting the internal combustion engine after completion of warming of the electrically heated catalyst when a sum of the catalyst warming period and the pre-air conditioning period is equal to or shorter than a starting time margin from a time of reception of the remote signal to the expected traveling start time.

* * * * *